United States Patent
Gordon et al.

(10) Patent No.: US 11,308,280 B2
(45) Date of Patent: Apr. 19, 2022

(54) CAPTURE AND SEARCH OF VIRTUAL MACHINE APPLICATION PROPERTIES USING LOG ANALYSIS TECHNIQUES

(71) Applicant: International Business Machines Corporation, Armonk, NY (US)

(72) Inventors: Itai Gordon, Modiin (IL); Kristin E. McNeil, Charlotte, NC (US); Radha Mohan De, Howrah (IN); Miriam Nizri, Jerusalem (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 16/747,531

(22) Filed: Jan. 21, 2020

(65) Prior Publication Data
US 2021/0224478 A1 Jul. 22, 2021

(51) Int. Cl.
*G06F 40/279* (2020.01)
*G06F 40/205* (2020.01)
(Continued)

(52) U.S. Cl.
CPC ........ *G06F 40/279* (2020.01); *G06F 9/45558* (2013.01); *G06F 40/205* (2020.01);
(Continued)

(58) Field of Classification Search
CPC .. G06F 40/279; G06F 40/205; G06F 9/45558; G06F 2009/45595; G06N 20/00; G06K 9/00442
See application file for complete search history.

(56) References Cited

U.S. PATENT DOCUMENTS 8,117,232 B2   2/2012   De Vorchik et al.
2009/0100420 A1   4/2009   Sapuntzakis et al.
(Continued)

OTHER PUBLICATIONS

Pereira et al "Virtual Machine Images Management Service for Cloud Infrastructures". 2012, [Online], pp. 401-406, [Retrieved from internet on Jan. 31, 2022], <https://www.scitepress.org/Papers/2012/39031/39031.pdf> (Year: 2012).*
(Continued)

*Primary Examiner* — S. Sough
*Assistant Examiner* — Zengpu Wei
(74) *Attorney, Agent, or Firm* — Konrad Raynes Davda & Victor LLP; Janaki K. Davda

(57) ABSTRACT

The capture and search of application properties for applications installed on virtual machines, includes obtaining a plurality of logs on a plurality of virtual machine images coupled to a network. For each given virtual machine image of the plurality of virtual machine images, the method includes: obtaining one or more logs on the given virtual machine image of the plurality of virtual machine images; analyzing each given log of the one or more logs to identify one or more concepts related to a set of application properties for one or more applications installed on the given virtual machine image; associating the one or more concepts and the set of application properties with an identity of the given virtual machine image; and storing the association of the one or more concepts and the set of application properties with the identity of the given virtual machine image in a virtual machine catalogue.

18 Claims, 5 Drawing Sheets

(51) Int. Cl.
*G06N 20/00* (2019.01)
*G06F 9/455* (2018.01)
*G06V 30/40* (2022.01)

(52) U.S. Cl.
CPC ............. *G06N 20/00* (2019.01); *G06V 30/40* (2022.01); *G06F 2009/45595* (2013.01)

(56) References Cited

U.S. PATENT DOCUMENTS

| | | | |
|---|---|---|---|
| 2011/0231455 A1 | 9/2011 | Joukov et al. | |
| 2014/0006355 A1* | 1/2014 | Kirihata | G06F 16/188 707/654 |
| 2014/0380308 A1* | 12/2014 | Hassine | G06F 9/45558 718/1 |
| 2015/0128131 A1* | 5/2015 | Cao | G06F 9/45558 718/1 |
| 2016/0085578 A1 | 3/2016 | Bhide et al. | |
| 2016/0306651 A1 | 10/2016 | Kripalani | |
| 2016/0357587 A1* | 12/2016 | Yadav | G06F 16/162 |
| 2017/0005923 A1* | 1/2017 | Babakian | G06F 9/45558 |
| 2017/0177860 A1 | 6/2017 | Suarez et al. | |
| 2017/0279826 A1* | 9/2017 | Mohanty | H04L 63/20 |
| 2018/0004870 A1* | 1/2018 | Ohayon | H04L 41/16 |
| 2018/0060575 A1* | 3/2018 | El-Moussa | H04L 63/1441 |
| 2018/0176106 A1* | 6/2018 | Raney | H04L 12/4641 |
| 2018/0285397 A1* | 10/2018 | Huang | G06F 16/86 |
| 2019/0324784 A1* | 10/2019 | Liang | G06F 9/45533 |
| 2020/0311112 A1* | 10/2020 | Meng | G06Q 10/063112 |

OTHER PUBLICATIONS

Brogi, Antonio, et al., "DockerFinder: Multi-attribute search of Docket images", 2017 IEEE International Conference on Cloud Engineering, Apr. 2017.

* cited by examiner

CAPTURE AND SEARCH OF VIRTUAL MACHINE APPLICATION PROPERTIES USING LOG ANALYSIS TECHNIQUES

BACKGROUND

In the software lifecycle development process, developers, testers, support and sales representatives need to utilize many virtual machines, or containers running in the virtual machines, to complete their tasks. Virtual machines or containers can be time consuming to develop and maintain. For example, some of the software on the virtual machines has a prerequisite of other software products in order to run. The installation of various software applications and their configurations on virtual machines are both tedious and time consuming. With large companies, employees are typically unaware of the software that other employees have already installed and configured on virtual machines or containers. The work of these other employees is thus not available when the same or similar software is being installed or configured on other virtual machines or containers.

SUMMARY

Disclosed herein is a method for capture and search of virtual machines based on application properties using log analysis techniques, and a computer program product and system as specified in the independent claims. Embodiments of the present invention are given in the dependent claims. Embodiments of the present invention can be freely combined with each other if they are not mutually exclusive.

According to an embodiment of the present invention, a method for capture and search of application properties for applications installed on virtual machines, includes obtaining, by a computer system, a plurality of logs on a plurality of virtual machine images coupled to a network. For each given virtual machine image of the plurality of virtual machine images, the method includes: obtaining, by the computer system, one or more logs on the given virtual machine image of the plurality of virtual machine images; analyzing, by the computer system, each given log of the one or more logs to identify one or more concepts related to a set of application properties for one or more applications installed on the given virtual machine image; associating, by the computer system, the one or more concepts and the set of application properties with an identity of the given virtual machine image; and storing, by the computer system, the association of the one or more concepts and the set of application properties with the identity of the given virtual machine image in a virtual machine catalogue.

DETAILED DESCRIPTION

To streamline the software development process and increase reusability, embodiments of the present invention provide a mechanism to capture properties of applications installed on virtual machines using log analysis techniques. The application properties can then be searched to locate a virtual machine image that matches a user's current development needs. The installation and/or configuration information for the applications on these virtual machine images can then be reused and/or modified for a specific user's current virtual machine build, thus increasing the efficiency of the development process.

Figure 1:
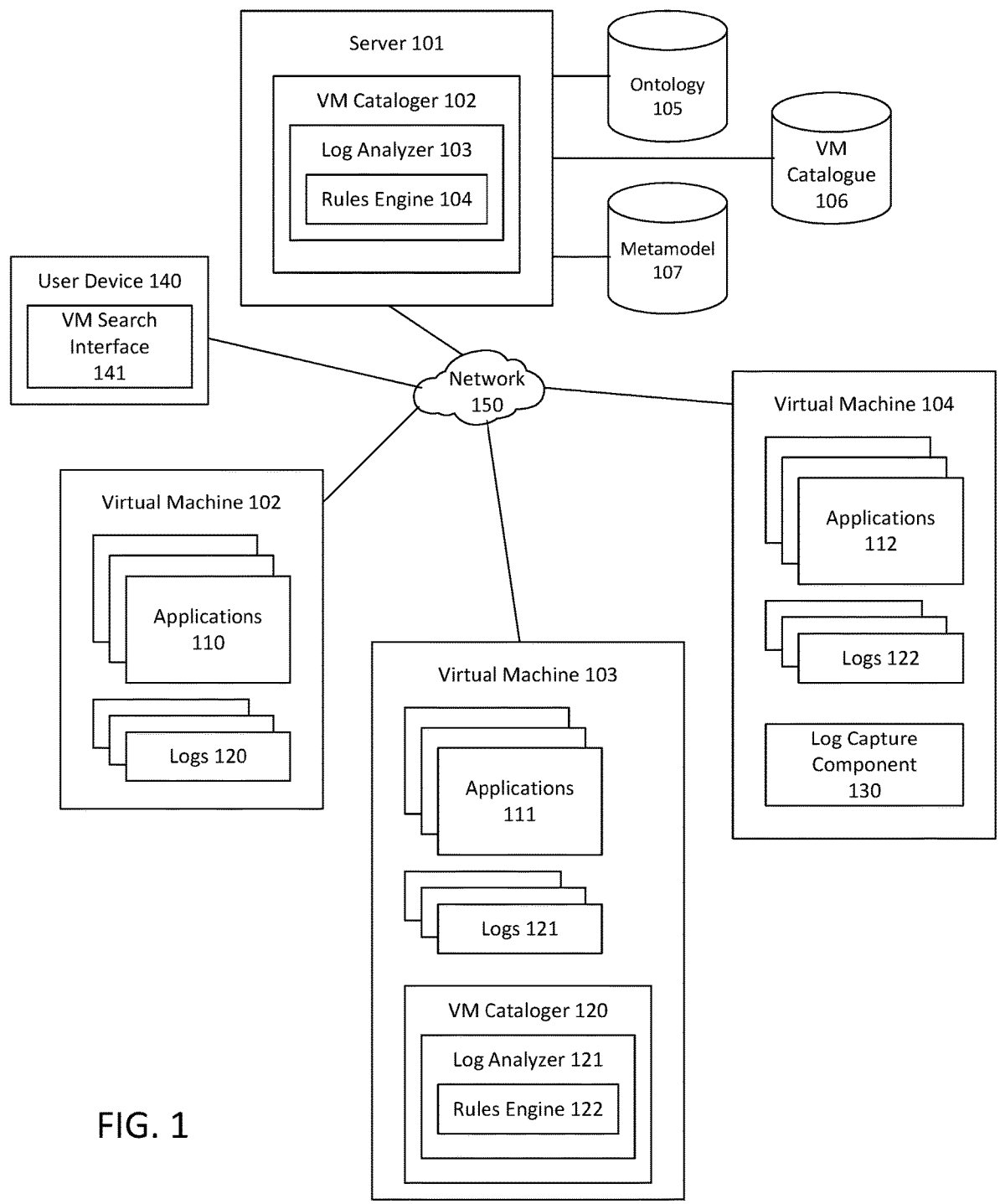
FIG. 1 illustrates a computing environment with a mechanism for the capture and search of properties of applications installed on virtual machines according to some embodiments of the present invention.

FIG. 1 illustrates a computing environment with a mechanism for the capture and search of properties of applications 111 installed on virtual machines according to some embodiments of the present invention. The computing environment includes a server 101 coupled to a plurality of virtual machines 102-104, possibly over a network 150. The server 101 is configured with a virtual machines (VM) cataloger 102 that captures properties of software applications 110-112 installed on virtual machines 102-104. The VM cataloger 102 includes a log analyzer 103 for analyzing the logs 120-122 of the virtual machines 102-104 and to extract information on the applications 110-112 installed on the virtual machines 102-104. In some embodiments, the log analyzer 103 uses a rules engine 104 to perform the analysis of the logs. The VM cataloger 102 is coupled to an ontology database 105, a VM catalogue 106, and optionally a metamodel 107. The ontology database 105 stores concepts for a set or class of entities within the domain of virtual machine software applications, properties of the applications, and the interrelationships between the concepts and the application properties. The ontology database 105 can be built based on a metamodel 107 that defines the relationships between the concepts in the ontology, the application properties, text patterns that can be found in logs, and a hierarchy between them. The level of ontology depth can be customized according to the applications or according to application use cases. The ontology database 105 are used by the log analyzer 103 in analyzing the logs to extract the concepts contained in the logs and the corresponding application properties contained in the logs. The extracted concepts and properties are then associated with the identity of the virtual machine from which the log was obtained and stored in the VM catalogue 106. When a user is installing or configuring a software component on a virtual machine, the user, via a VM search interface 141 at a user device 140, can search the VM catalogue 106 to locate a virtual machine image developed by another that includes the same or similar application properties. The user can then use the search results to more efficiently install and configure the software application on a virtual machine.

In some embodiments, in building the metamodel 107, a business glossary of an organization that contains relationships between concepts in the organization is imported. Regular expressions in specific logs or data sources can be examined in order to extract data that is relevant to the organization, such as local IP addresses, typical machines names, etc. Other sources of information can also be used to improve the metamodel 107. For example, relevant network sites with information on data that should appear in a log for certain software components can be analyzed using natural language processing, the results of which is used to build or improve the metamodel 107.

Although embodiments of the present invention are described herein with reference to virtual machines, the embodiments can also be equally applied to containers without departing from the spirit and scope of the present invention.

In some embodiments, the server 101 obtains the logs 120-122 from the virtual machines 102-104 by "crawling" virtual machines connected to the network 150. The crawl can be conducted periodically, according to a schedule, or real-time in response to the receipt of a search request from a user device 140. In some embodiments, the log analyzer 103 can also work in a stream application in order to immediately identify logging that is required. Stream applications have streaming log services which can be captured as log streams.

In other embodiments, a log capture component 130 is installed on a virtual machine 104, or a container installed on the virtual machine 104, where the log capture component 130 is configured to collect and send copies of the logs 122 to the server 101. The log capture component 130 can be configured with what data from the logs to collect and/or with a schedule of when to send the copies to the server 101. The log capture component 130 can be remotely configured by the server 101, such as through the input of a conditional script to run and return a result to the server 101. The conditional script can be based on the virtual machine or container data properties. In some embodiments, the script is signed and contains only read only operations in order to address potential security risks. In some embodiments, the log capture component 130 is configured to collect and send to the server 101 other logs of the virtual machine's operating system or of specific applications executing on the virtual machine 104.

In other embodiments, the capture of application properties is performed locally to the virtual machine 103, where the VM cataloger 120, with a log analyzer 121 and optionally a rules engine 122, are installed and run on the virtual machine 103. The VM cataloger 120 is configured with remote access to the ontology 105. The concepts and application properties extracted by the VM cataloger 120, and their association with a virtual machine image identity, are sent to the server 101 and stored in the VM catalogue 106.

Figure 2:
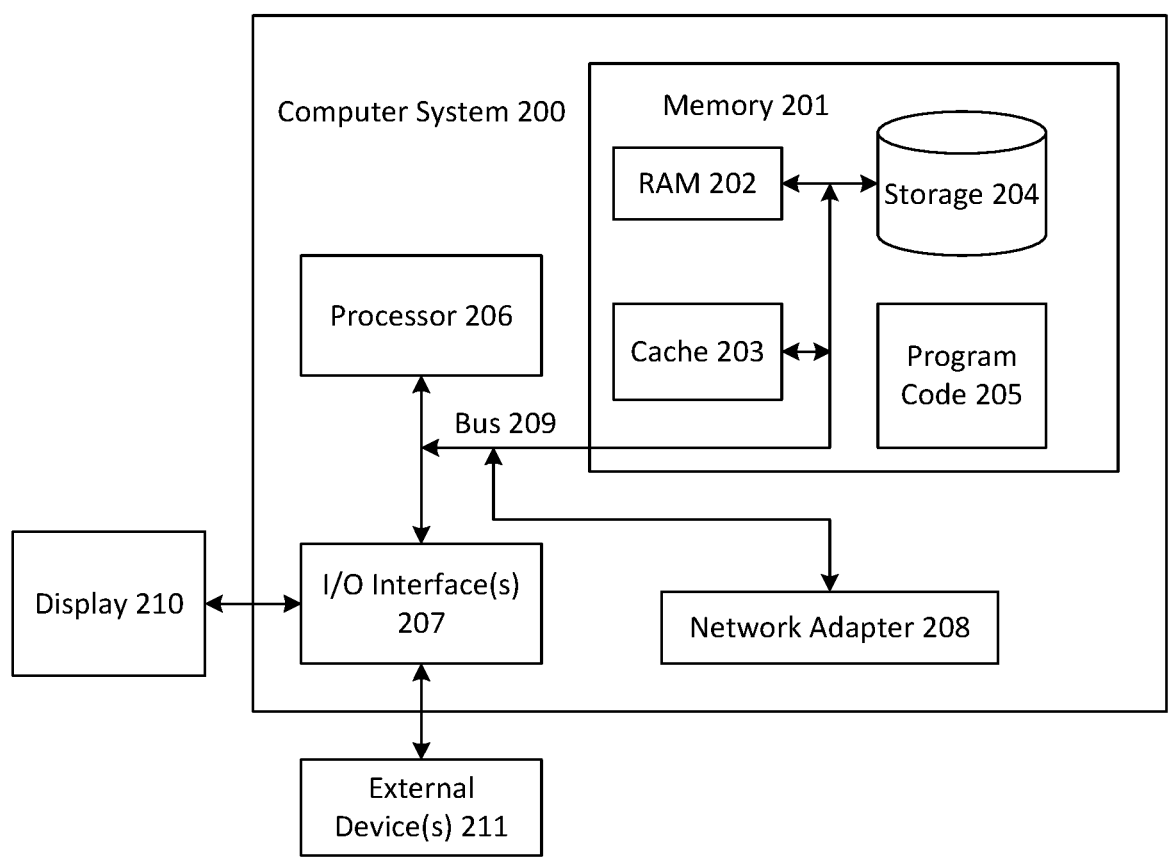
FIG. 2 illustrates a computer system, one or more of which implements the server, the user device, and/or the virtual machines, according to embodiments of the present invention.

FIG. 2 illustrates a computer system, one or more of which implements the server 101, the user device 140, and/or the virtual machines 102-104, according to embodiments of the present invention. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 210, via I/O interfaces 207.

The computer system 200 may communicate with one or more networks via network adapter 208.

Figure 3:
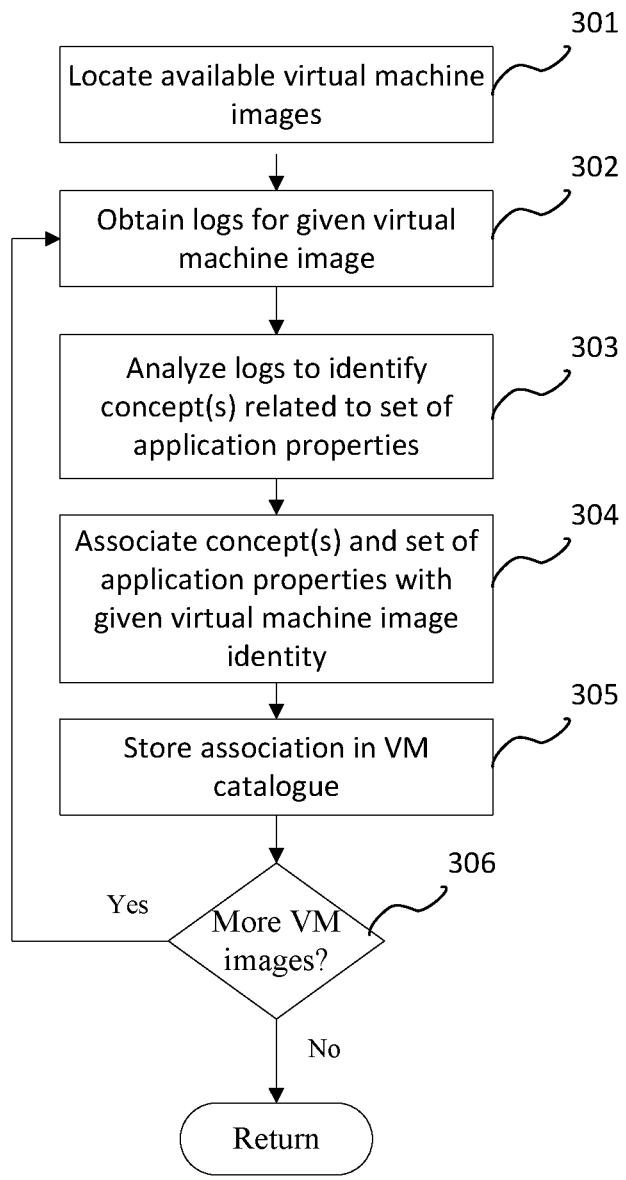
FIG. 3 illustrates a method for capturing virtual machines and application properties using log analysis techniques, according to some embodiments.

FIG. 3 illustrates a method for capturing virtual machines and application properties using log analysis techniques, according to some embodiments. The VM cataloger 102 locates available virtual machine images 102-104 (301). For each given virtual machine image (e.g. virtual machine 102), the VM cataloger 102 obtains the logs 120-122 for the given virtual machine image 102 (302). The log analyzer 103 analyzes the logs 120 from the given virtual machine 102 to identify one or more concepts related to a set of application properties contained in the logs 120 (303). The VM cataloger 102 associates the concept(s) and the set of application properties with the identity of the given virtual machine image (304), and the association is stored in the VM catalogue 106 (305). Blocks 302-305 are repeated for each virtual machine image located.

Figure 4:
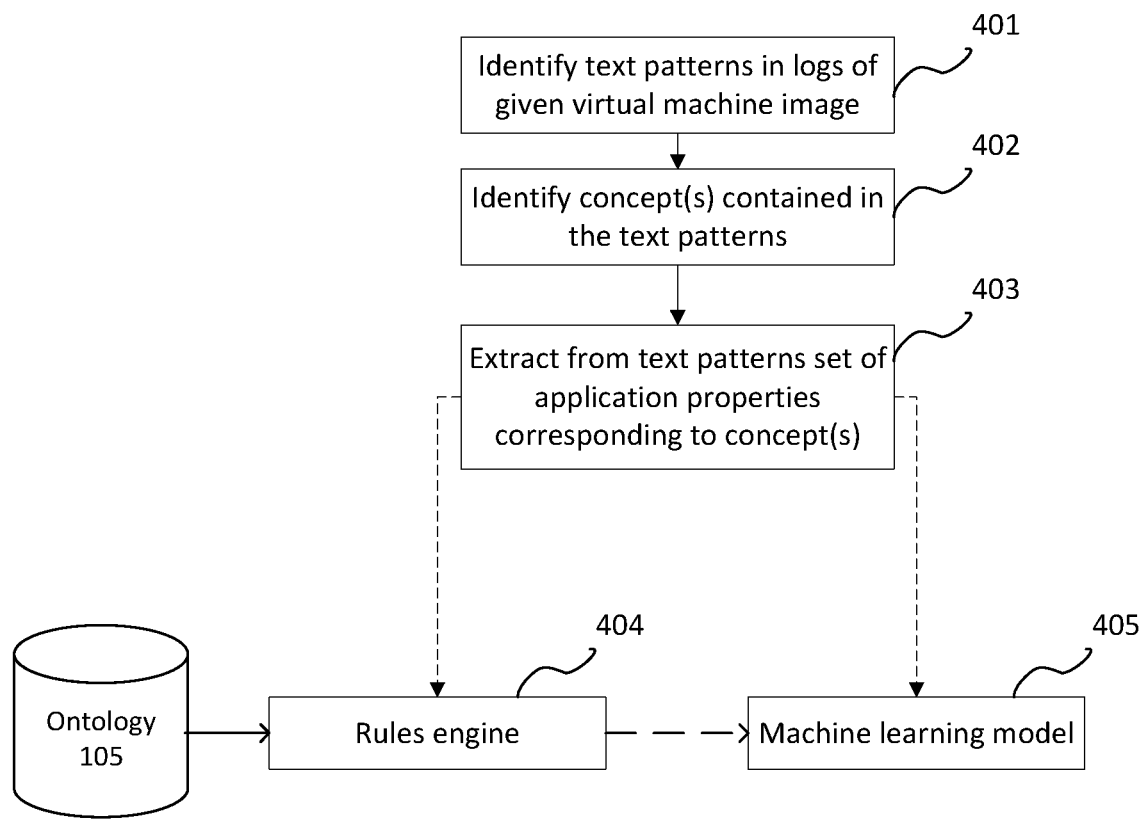
FIG. 4 illustrates a method for identifying concepts and application properties according to some embodiments.

FIG. 4 illustrates a method for identifying concepts and application properties according to some embodiments. After obtaining the logs 120 of a given virtual machine image 102, the log analyzer 103 scans each log, performs a text analysis of each log, and identifies text patterns in each of the logs 120 of the given virtual machine image 102 (401). The log analyzer 103 identifies one or more concepts contained in the text patterns (402), and extracts, from the text patterns, the set of application properties corresponding to the concept(s) (403). For example, the text patterns in the log can be traversed to identify "java" as a concept and application names, versions, configurations, and network settings as application properties. Natural language processing techniques can be used to identify key phrases and extract their meanings, such as "I am connected to <domain>", "<software> successfully installed", or "<function> was successfully enabled".

In some embodiments, a rules engine 104 is used to extract the application properties from the text patterns (404). The rules engine 104 is configured with possible text patterns and parsing rules. The rules engine 104 parses the text in the logs to identity text patterns, uses the ontology database 105 to identify the concepts contained in the text patterns, and extracts the set of application properties corresponding to the concepts from the text patterns. In other embodiments, instead of a rules engine 104, the log analyzer 103 uses a machine learning model to identify the concepts in the text patterns and to extract the application properties (405). The machine learning model is trained by inputting sample logs or a sample virtual machine, tagged with relevant concepts for the sample virtual machine. Certain lines of the log can be highlighted to train the machine learning model to map the concepts to the log. When the sample virtual machine is input, the logs can be tagged with the relevant concepts to train the machine learning model to map the concepts to the sample virtual machine. The machine learning model can be further trained to calculate the probability that a given text pattern in the logs should be mapped to a given concept, i.e., the probability that the concept actually exists in the virtual machine when the given text pattern is found in the logs. In some embodiments, a hybrid approach is used, where the machine learning model is further trained using the text patterns and relationships configured in the rules engine 104. The machine learning model then learns new text patterns and their associations with concepts and application properties in subsequent iterations.

Figure 5:
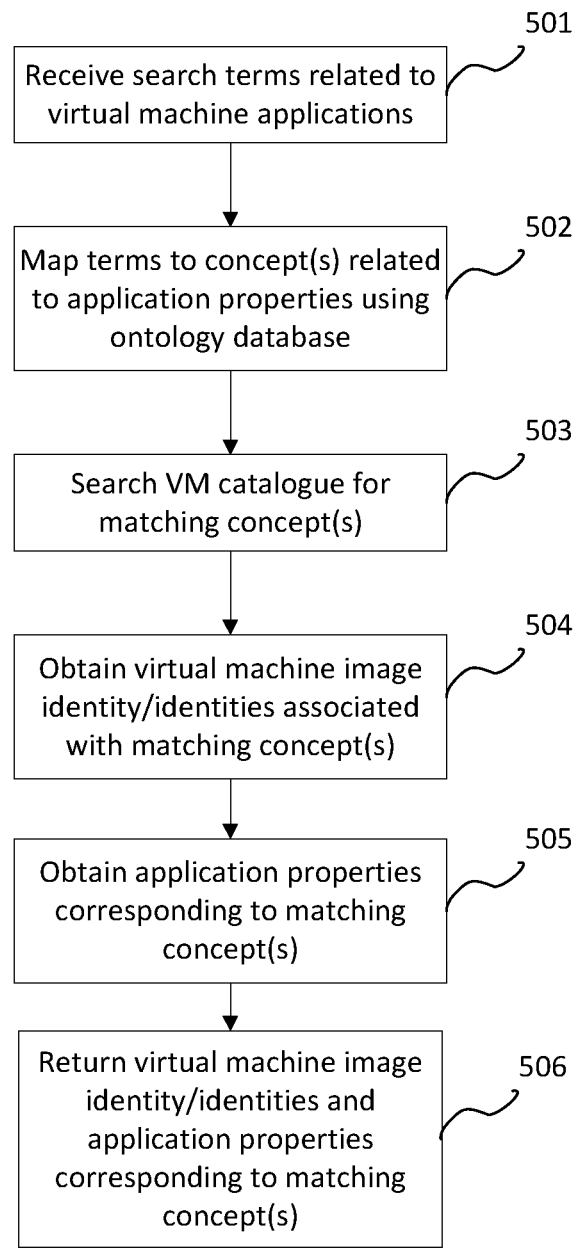
FIG. 5 illustrates a search of virtual machines based on properties of applications installed on the virtual machines, according to some embodiments.

FIG. 5 illustrates a search of virtual machines based on properties of applications installed on the virtual machines, according to some embodiments. A user, via a VM search interface 141 at a user device 140, enters search terms related to virtual machine software components. The server 101 receives a search query containing the search terms (501). In response, the VM cataloger 102 analyzes the search terms using natural language processing and maps the terms to one or more concepts related to application properties using the ontology database 105 (502). The VM cataloger 102 then searches the VM catalogue 106 for matching concept(s) (503) and obtains the virtual machine image identity or identities associated with the matching concept(s) (504). The VM cataloger 102 obtains the application properties corresponding to the matching concept(s) from the VM catalogue 106 (505). Search results containing the virtual machine image identity/identities and the associated concept(s) with corresponding application properties to the user via the VM search interface 141 (505). For example, assume that the search terms include "jvm installed" and the search terms map to "Java" and "JVM" concepts. Identities of virtual machines with logs containing text patterns indicating that Java or JVM concepts are returned, along with the Java or JVM properties extracted from the logs. The search results can be ranked based on the probability that a concept or application property satisfies the search query. The user can then use the search results to view the configuration or other information about the application installed or executed on the virtual machine image. User feedback on the returned search results can also be gathered and input into the machine learning model to continue to improve the accuracy of the model.

Embodiments of the present invention provides a more consistent approach to configuring virtual machines or containers, thus reducing cost and time. Typically, skill is involved in the installation and configuration of software applications, with users experiencing a learning curve. By providing a mechanism for capturing the properties of applications that can be searched, the skills of other users can be leveraged. The rework of configuring the same components by different users can be reduced or eliminated, increasing the efficiency of the development process. Further, since the embodiments capture the application properties through the analysis of virtual machine logs, information beyond what is typically stored in the virtual machine metadata can be extracted. Virtual machine metadata is typically configured by a user. By analyzing the logs, information not configured in the metadata can be captured. Further, by analyzing the logs, the search can be based on applications actually installed or configured on a virtual machine or container.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capture and search of application properties for applications installed on virtual machines, comprising:
   locating, by a computer system, a plurality of virtual machine images coupled to a network;
   for each given virtual machine image of the plurality of virtual machine images, comprising:
      obtaining, by the computer system, one or more logs on the given virtual machine image of the plurality of virtual machine images, wherein the one or more logs include information on one or more applications installed on the given virtual machine image;
      analyzing, by the computer system, each given log of the one or more logs to identify one or more concepts related to a set of application properties for the one or more applications installed on the given virtual machine image by using a machine learning model that receives each given log as input to:
         parse, using the machine learning model, text in the given log to identify one or more text patterns;
         identify, using the machine learning model, the one or more concepts contained in the one or more text patterns in the given log using an ontology database;
         extract, using the machine learning model, from the one or more text patterns the set of application properties corresponding to the one or more concepts using the ontology database; and
         calculate, using the machine learning model, a probability that the one or more concepts exist in the given virtual machine image when the one or more text patterns are found in the one or more logs;
      associating, by the computer system, the one or more concepts and the set of application properties with an identity of the given virtual machine image; and
      storing, by the computer system, the association of the one or more concepts and the set of application properties with the identity of the given virtual machine image in a virtual machine catalogue;
   receiving, by the computer system, one or more search terms related to the plurality of virtual machine images;
   locating, by the computer system, a stored virtual machine image for one virtual machine based on the one or more search terms; and
   installing, by the computer system, the stored virtual machine image for another virtual machine.

2. The method of claim 1, wherein the machine learning model is trained using the one or more text patterns and relationships configured in a rules engine.

3. The method of claim 1, further comprising:
   mapping, by the computer system, the one or more search terms to one or more second concepts;
   searching the virtual machine catalogue, by the computer system, for one or more third concepts matching the one or more second concepts;
   obtaining, from the virtual machine catalogue by the computer system, one or more virtual machine image identities associated with the one or more third concepts;
   obtaining, from the virtual machine catalogue by the computer system, another set of application properties corresponding to the one or more third concepts; and
   returning, as a search result, by the computer system, the one or more virtual machine image identities and the another set of application properties corresponding to the one or more third concepts.

4. The method of claim 1, wherein the obtaining of the one or more logs on the plurality of virtual machine images further comprises:
   performing, by the computer system, a crawl of the plurality of virtual machines to obtain the one or more logs on the plurality of virtual machines.

5. The method of claim 1, wherein the obtaining of the one or more logs on the plurality of virtual machine images further comprises:
   collecting, by a log capture component configured on the given virtual machine image, the one or more logs.

6. The method of claim 1, wherein the storing of the association of the one or more concepts and the set of application properties with the identity of the given virtual machine image in the virtual machine catalogue further comprises:
   sending, by the computer system to a server, the association of the one or more concepts and the set of application properties with the identity of the given virtual machine image, wherein the server stores the association of the one or more concepts and the set of application properties with the identity of the given virtual machine image in the virtual machine catalogue.

7. A computer program product for capture and search of application properties for applications installed on virtual machines, the computer program product comprising:
   one or more computer readable storage media, and program instructions collectively stored on the one or more computer readable storage media and executable by one or more computer processors, the program instructions comprising:
   locating a plurality of virtual machine images coupled to a network;
   for each given virtual machine image of the plurality of virtual machine images, comprising:
      obtaining one or more logs on the given virtual machine image of the plurality of virtual machine images, wherein the one or more logs include information on one or more applications installed on the given virtual machine image;
      analyzing each given log of the one or more logs to identify one or more concepts related to a set of application properties for the one or more applications installed on the given virtual machine image by using a machine learning model that receives each given log as input to:
         parse, using the machine learning model, text in the given log to identify one or more text patterns;
         identify, using the machine learning model, the one or more concepts contained in the one or more text patterns in the given log using an ontology database;
         extract, using the machine learning model, from the one or more text patterns the set of application properties corresponding to the one or more concepts using the ontology database; and
         calculate, using the machine learning model, a probability that the one or more concepts exist in the given virtual machine image when the one or more text patterns are found in the one or more logs;
      associating the one or more concepts and the set of application properties with an identity of the given virtual machine image; and
      storing the association of the one or more concepts and the set of application properties with the identity of the given virtual machine image in a virtual machine catalogue;
   receiving one or more search terms related to the plurality of virtual machine images;
   locating a stored virtual machine image for one virtual machine based on the one or more search terms; and
   installing the stored virtual machine image for another virtual machine.

8. The computer program product of claim 7, wherein the machine learning model is trained using the one or more text patterns and relationships configured in a rules engine.

9. The computer program product of claim 7, wherein the program instructions further comprise:
   mapping the one or more search terms to one or more second concepts;
   searching the virtual machine catalogue for one or more third concepts matching the one or more second concepts;
   obtaining, from the virtual machine catalogue, one or more virtual machine image identities associated with the one or more third concepts;
   obtaining, from the virtual machine catalogue, another set of application properties corresponding to the one or more third concepts; and
   returning, as a search result, the one or more virtual machine image identities and the another set of application properties corresponding to the one or more third concepts.

10. The computer program product of claim 7, wherein the program instructions for the obtaining of the one or more logs on the plurality of virtual machine images further comprise:
    performing a crawl of the plurality of virtual machines to obtain the one or more logs on the plurality of virtual machines.

11. The computer program product of claim 7, wherein the program instructions for the obtaining of the one or more logs on the plurality of virtual machine images further comprise:
    collecting, by a log capture component configured on the given virtual machine image, the one or more logs.

12. The computer program product of claim 7, wherein the program instructions for storing of the association of the one or more concepts and the set of application properties with the identity of the given virtual machine image in the virtual machine catalogue further comprise:
    sending, to a server, the association of the one or more concepts and the set of application properties with the identity of the given virtual machine image, wherein the server stores the association of the one or more concepts and the set of application properties with the identity of the given virtual machine image in the virtual machine catalogue.

13. A system comprising:
    one or more processors; and
    one or more computer readable storage media, and program instructions collectively stored on the one or more computer readable storage media and executable by the one or more processors, the program instructions comprising:
    locating a plurality of virtual machine images coupled to a network;
    for each given virtual machine image of the plurality of virtual machine images, comprising:
       obtaining one or more logs on the given virtual machine image of the plurality of virtual machine images, wherein the one or more logs include information on one or more applications installed on the given virtual machine image;
       analyzing each given log of the one or more logs to identify one or more concepts related to a set of application properties for the one or more applications installed on the given virtual machine image by using a machine learning model that receives each given log as input to:
          parse, using the machine learning model, text in the given log to identify one or more text patterns;

identify, using the machine learning model, the one or more concepts contained in the one or more text patterns in the given log using an ontology database;

extract, using the machine learning model, from the one or more text patterns the set of application properties corresponding to the one or more concepts using the ontology database; and calculate, using the machine learning model, a probability that the one or more concepts exist in the given virtual machine image when the one or more text patterns are found in the one or more logs;

associating the one or more concepts and the set of application properties with an identity of the given virtual machine image; and storing the association of the one or more concepts and the set of application properties with the identity of the given virtual machine image in a virtual machine catalogue;

receiving one or more search terms related to the plurality of virtual machine images;

locating a stored virtual machine image for one virtual machine based on the one or more search terms; and installing the stored virtual machine image for another virtual machine.

14. The system of claim 13, wherein the machine learning model is trained using the one or more text patterns and relationships configured in a rules engine.

15. The system of claim 13, wherein the program instructions further comprise:

mapping the one or more search terms to one or more second concepts;

searching the virtual machine catalogue for one or more third concepts matching the one or more second concepts;

obtaining, from the virtual machine catalogue, one or more virtual machine image identities associated with the one or more third concepts;

obtaining, from the virtual machine catalogue, another set of application properties corresponding to the one or more third concepts; and returning, as a search result, the one or more virtual machine image identities and the another set of application properties corresponding to the one or more third concepts.

16. The system of claim 13, wherein the program instructions for the obtaining of the one or more logs on the plurality of virtual machine images further comprise:

performing a crawl of the plurality of virtual machines to obtain the one or more logs on the plurality of virtual machines.

17. The system of claim 13, wherein the program instructions for the obtaining of the one or more logs on the plurality of virtual machine images further comprise:

collecting, by a log capture component configured on the given virtual machine image, the one or more logs.

18. The system of claim 13, wherein the program instructions for the storing of the association of the one or more concepts and the set of application properties with the identity of the given virtual machine image in the virtual machine catalogue further comprise:

sending, to a server, the association of the one or more concepts and the set of application properties with the identity of the given virtual machine image, wherein the server stores the association of the one or more concepts and the set of application properties with the identity of the given virtual machine image in the virtual machine catalogue.

* * * * *